United States Patent
Nishimura et al.

(10) Patent No.: US 9,962,613 B2
(45) Date of Patent: May 8, 2018

(54) GAME DEVICE AND INFORMATION STORAGE MEDIUM

(71) Applicant: BANDAI NAMCO Games Inc., Shinagawa-ku, Tokyo (JP)

(72) Inventors: Norihiro Nishimura, Tokyo (JP); Takehiro Shimizu, Tokyo (JP); Tatsuya Ishiyama, Tokyo (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 308 days.

(21) Appl. No.: 14/659,755

(22) Filed: Mar. 17, 2015

(65) Prior Publication Data

US 2015/0273334 A1  Oct. 1, 2015

(30) Foreign Application Priority Data

Mar. 31, 2014  (JP) .................................. 2014-072238

(51) Int. Cl.
*A63F 13/56*  (2014.01)
*A63F 13/211*  (2014.01)
(Continued)

(52) U.S. Cl.
CPC ............ *A63F 13/56* (2014.09); *A63F 13/211* (2014.09); *A63F 13/212* (2014.09); *A63F 13/525* (2014.09); *A63F 13/837* (2014.09)

(58) Field of Classification Search
CPC .. A63F 13/219; A63F 13/525; A63F 13/5255; A63F 13/533; A63F 13/837
See application file for complete search history.

(56) References Cited

U.S. PATENT DOCUMENTS

| 5,853,324 A | 12/1998 | Kami et al. |
| 6,165,073 A | 12/2000 | Miyamoto et al. |

(Continued)

FOREIGN PATENT DOCUMENTS

| CN | 1221155 A | 6/1999 |
| EP | 2 072 098 A1 | 6/2009 |

(Continued)

OTHER PUBLICATIONS

Search Report dated Jul. 2, 2015 issued in corresponding GB patent application No. GB1504491.0.

*Primary Examiner* — Jay Liddle
(74) *Attorney, Agent, or Firm* — Posz Law Group, PLC (57) ABSTRACT

A game device includes an area determination section that determines an area in which a virtual camera is located in a game space, an enemy character control section that controls the motion of an enemy character, and a game control section that controls an attack on the enemy character in the area in which the virtual camera is located, the game control section setting an input section among a plurality of input sections to be an input section that allows the player to perform an area change input based on the determination result of the area determination section, changing the area in which the virtual camera is located when the input section that allows the player to perform the area change input has been operated, and enabling an attack input for attacking the enemy character when an input section other than the input section that allows the player to perform the area change input has been operated, and the enemy character control section controlling the enemy character based on the determination result of the area determination section.

9 Claims, 9 Drawing Sheets

(51) Int. Cl.
 *A63F 13/212* (2014.01)
 *A63F 13/525* (2014.01)
 *A63F 13/837* (2014.01)

(56) References Cited

U.S. PATENT DOCUMENTS

| | | | | |
|---|---|---|---|---|
| 6,379,249 | B1* | 4/2002 | Satsukawa | A63F 13/04 |
| | | | | 273/148 B |
| 6,626,760 | B1 | 9/2003 | Miyamoto et al. | |
| 6,972,756 | B1* | 12/2005 | Yamamoto | A63F 13/10 |
| | | | | 345/419 |
| 7,008,323 | B1* | 3/2006 | Hayashi | A63F 13/10 |
| | | | | 463/32 |
| 7,011,582 | B1* | 3/2006 | Yamamoto | A63F 13/10 |
| | | | | 463/15 |
| 8,118,653 | B2* | 2/2012 | Langridge | G09B 19/00 |
| | | | | 463/23 |
| 2002/0022508 | A1* | 2/2002 | Ikariko | A63F 13/04 |
| | | | | 463/5 |
| 2002/0022518 | A1* | 2/2002 | Okuda | A63F 13/08 |
| | | | | 463/36 |
| 2002/0065121 | A1* | 5/2002 | Fukunaga | A63F 13/08 |
| | | | | 463/8 |
| 2003/0032478 | A1* | 2/2003 | Takahama | A63F 13/04 |
| | | | | 463/30 |
| 2003/0234819 | A1* | 12/2003 | Daly | G06F 17/30029 |
| | | | | 715/810 |
| 2007/0270226 | A1 | 11/2007 | York et al. | |
| 2009/0104995 | A1* | 4/2009 | Matsuyama | A63F 13/10 |
| | | | | 463/42 |
| 2009/0118010 | A1* | 5/2009 | Ashida | A63F 13/10 |
| | | | | 463/36 |
| 2009/0209336 | A1* | 8/2009 | Onodera | A63F 13/10 |
| | | | | 463/31 |
| 2010/0009734 | A1* | 1/2010 | Sambongi | A63F 13/10 |
| | | | | 463/5 |

FOREIGN PATENT DOCUMENTS

| | | |
|---|---|---|
| EP | 2 371 433 A2 | 10/2011 |
| JP | H09-131466 A | 5/1997 |

* cited by examiner

GAME DEVICE AND INFORMATION STORAGE MEDIUM

Japanese Patent Application No. 2014-072238, filed on Mar. 31, 2014, is hereby incorporated by reference in its entirety.

BACKGROUND OF THE INVENTION

The present invention relates to a game device and an information storage medium.

JP-A-9-131466 discloses a shooting game device that allows a player to selectively input an attack state or a defense state by operating a foot-operated input means with a foot.

The shooting game device disclosed in JP-A-9-131466 merely allows the player to switch the state between the attack state and the defense state, and it is impossible to switch the position of the virtual player between a position at which the player can attack the enemy character head-on, and a position at which the player can attack the enemy character on the flank. Therefore, the player cannot strategically play the game by attacking the enemy character while changing the position of the virtual player in accordance with to the state of the enemy character, for example. This impairs game playability. If the shooting game device is provided with an input means for changing the position of the virtual player relative to the enemy character, the player must perform a complex operation.

SUMMARY

Several aspects of the invention may provide a game device and an information storage medium that can realize a highly interesting game that requires only a simple operation.

According to a first aspect of the invention, there is provided a game device that includes a plurality of input sections, and executes a game in which a player character attacks an enemy character based on an attack input performed by a player, the game device including:

an area determination section that determines an area among a plurality of areas in which the player character or a virtual camera is located in a game space, the area in which the player character or the virtual camera is located being able to be changed by performing an input using an input section among the plurality of input sections;

an enemy character control section that controls a motion of one or more enemy characters in the game space; and a game control section that controls an attack on the one or more enemy characters from the area in which the player character or the virtual camera is located, the game control section setting an input section among the plurality of input sections to be an input section that allows the player to perform an area change input for changing the area in which the player character or the virtual camera is located, based on a determination result of the area determination section, changing the area in which the player character or the virtual camera is located when the input section among the plurality of input sections that allows the player to perform the area change input has been operated, and enabling the attack input for attacking the one or more enemy characters in the area in which the player character or the virtual camera is located when an input section among the plurality of input sections other than the input section that allows the player to perform the area change input has been operated, and the enemy character control section controlling the one or more enemy characters based on the determination result of the area determination section.

According to a second aspect of the invention, there is provided a computer-readable information storage medium storing a program that causes a computer included in a game device that includes a plurality of input sections, and executes a game in which a player character attacks an enemy character based on an attack input performed by a player, to function as:

an area determination section that determines an area among a plurality of areas in which the player character or a virtual camera is located in a game space, the area in which the player character or the virtual camera is located being able to be changed by performing an input using an input section among the plurality of input sections;

an enemy character control section that controls a motion of one or more enemy characters in the game space; and a game control section that controls an attack on the one or more enemy characters from the area in which the player character or the virtual camera is located, the game control section setting an input section among the plurality of input sections to be an input section that allows the player to perform an area change input for changing the area in which the player character or the virtual camera is located, based on a determination result of the area determination section, changing the area in which the player character or the virtual camera is located when the input section among the plurality of input sections that allows the player to perform the area change input has been operated, and enabling the attack input for attacking the one or more enemy characters in the area in which the player character or the virtual camera is located when an input section among the plurality of input sections other than the input section that allows the player to perform the area change input has been operated, and the enemy character control section controlling the one or more enemy characters based on the determination result of the area determination section.

DETAILED DESCRIPTION OF THE EMBODIMENT (1) According to one embodiment of the invention, a game device includes a plurality of input sections, and executes a game in which a player character attacks an enemy character based on an attack input performed by a player, the game device including:

an area determination section that determines an area among a plurality of areas in which the player character or a virtual camera is located in a game space, the area in which the player character or the virtual camera is located being able to be changed by performing an input using an input section among the plurality of input sections;

an enemy character control section that controls a motion of one or more enemy characters in the game space; and a game control section that controls an attack on the one or more enemy characters from the area in which the player character or the virtual camera is located, the game control section setting an input section among the plurality of input sections to be an input section that allows the player to perform an area change input for changing the area in which the player character or the virtual camera is located, based on a determination result of the area determination section, changing the area in which the player character or the virtual camera is located when the input section among the plurality of input sections that allows the player to perform the area change input has been operated, and enabling the attack input for attacking the one or more enemy characters in the area in which the player character or the virtual camera is located when an input section among the plurality of input sections other than the input section that allows the player to perform the area change input has been operated, and the enemy character control section controlling the one or more enemy characters based on the determination result of the area determination section.

Another embodiment of the invention relates to a computer-readable information storage medium storing a program that causes a computer included in a game device that includes a plurality of input sections, and executes a game in which a player character attacks an enemy character based on an attack input performed by a player, to function as each of the above sections.

According to the above embodiments, the player can change the area in which the player character or the virtual camera is located by operating the input section among the plurality of input sections that allows the player to perform the area change input, and perform the attack input for attacking the enemy character by operating an input section other than the input section that allows the player to perform the area change input. Specifically, the player can change the area in which the player character or the virtual camera is located, and enable the attack input by operating (using) the plurality of input sections. This makes it possible to realize a highly interesting game that requires only a simple operation.

(2) In each of the game device and the information storage medium, the enemy character control section may set a state of the enemy character to a state in which the enemy character cannot make an attack in the area in which the player character or the virtual camera is located until a predetermined time elapses after the area in which the player character or the virtual camera is located has been changed, and set the state of the enemy character to a state in which the enemy character can make an attack in the area in which the player character or the virtual camera is located when the predetermined time has elapsed.

According to this configuration, since the enemy character does not make an attack until the predetermined time elapses after the position of the player character or the virtual camera has been changed, the player can enjoy game play in which the player character attacks the enemy character within the predetermined time after changing the position of the player character or the virtual camera, and changes the position of the player character or the virtual camera again, for example. This makes it possible to realize a more interesting game.

(3) The game device may further include a notification section that presents a notification that instructs the player to operate the input section that allows the player to perform the area change input when a time in which the plurality of input sections are not operated has reached a predetermined time.

The information storage medium may store a program that causes the computer to further function as a notification section that presents a notification that instructs the player to operate the input section that allows the player to perform the area change input when a time in which the plurality of input sections are not operated has reached a predetermined time.

This makes it possible to prompt the player to perform an operation that changes the position of the player character or the virtual camera when the plurality of input sections are not operated.

(4) The game device may further include a notification section that presents a notification that instructs the player to operate the input section that allows the player to perform the area change input when the number of times in which the input section other than the input section that allows the player to perform the area change input has been consecutively operated, has reached a predetermined number.

The information storage medium may store a program that causes the computer to further function as a notification section that presents a notification that instructs the player to operate the input section that allows the player to perform the area change input when a number of times in which the input section other than the input section that allows the player to perform the area change input has been consecutively operated, has reached a predetermined number.

This makes it possible to prompt the player to perform an operation that changes the position of the player character or the virtual camera when only the input section other than the input section that allows the player to perform the area change input is operated.

(5) In each of the game device and the information storage medium, when the area in which the player character or the virtual camera is located is changed and a state of the enemy character is in a state that the enemy character can make an attack in the area in which the player character or the virtual camera is located, the game control section may disable an operation performed on the input section that allows the player to perform the area change input.

This makes it possible to prevent occurrence of a situation in which the player character is attacked by the enemy character immediately after changing the position of the player character or the virtual camera, for example.

(6) In each of the game device and the information storage medium, the enemy character control section may set a state of at least some of the one or more enemy characters to a defense state when a predetermined time has elapsed after the input section other than the input section that allows the player to perform the area change input has been operated.

According to this configuration, since the state of the enemy character is set to the defense state when the predetermined time has elapsed after the input section other than the input section that allows the player to perform the area change input has been operated, it is possible to motivate the player to operate the input section that allows the player to perform the area change input. This makes it possible to realize a more interesting game.

Exemplary embodiments of the invention are described below. Note that the following exemplary embodiments do not unduly limit the scope of the invention as stated in the claims. Note also that all of the elements described below in connection with the following exemplary embodiments should not necessarily be taken as essential elements of the invention.

1. Configuration

Figure 1:
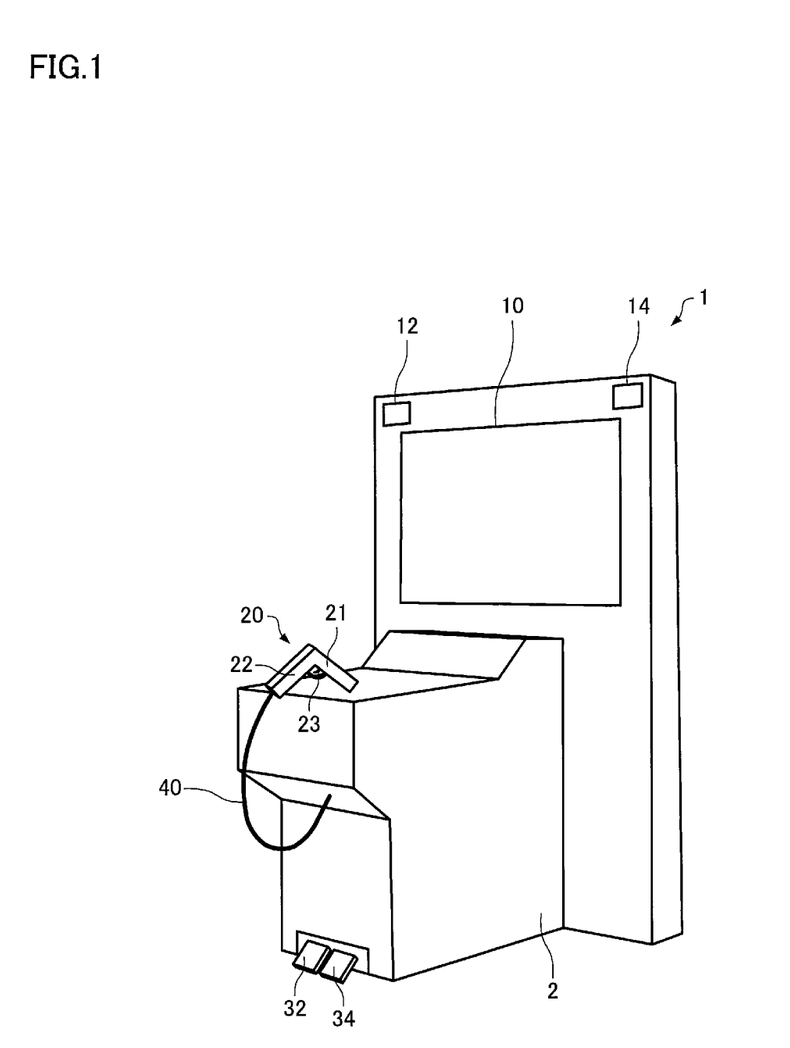
FIG. 1 is a schematic external view illustrating the configuration of a game device according to one embodiment of the invention.

FIG. 1 is a schematic external view illustrating the configuration of a game device according to one embodiment of the invention. A game device 1 in this embodiment is configured to implement a game in which the player character shoots (attacks) an enemy character located in a game space (e.g., object space) using a gun-type controller.

The game device 1 in this embodiment includes a housing 2 in which a processing section (computer) that performs a game process and the like is placed, a display section 10 (display) that is provided over the housing 2, and displays a game image including an enemy character, two reflectors 12 and 14 that are provided over the display section 10, and a gun-type controller 20 that is held by the player, and used to indicate a position on the display section 10 (game screen). The game device 1 also includes a first input section 32 and a second input section 34 (i.e., a plurality of input sections) that are provided at the bottom of the housing 2. The controller 20 is connected to the housing 2 (processing section) through a communication cable 40. A slot (not illustrated in FIG. 1) for inserting a coin is provided to the housing 2. The game starts when the player has inserted a coin into the slot, and the game image is displayed on the display section 10.

The controller 20 has a shape that imitates a gun, and includes a main body 21, and a grip 22 that is provided on the lower side of the main body 21, and held by the player. A trigger 23 that is operated by the forefinger of a hand that holds the grip 22 is provided on the lower side of the main body 21, the trigger 23 being provided on the front side of the grip 22. The front end of the main body 21 is provided with a light-emitting section that includes an infrared light source (e.g., infrared LED), and an imaging section (e.g., CMOS sensor or CCD sensor) that functions as an indication position detection section. The light-emitting section allows infrared light emitted from the infrared light source to travel in the direction toward the front end (corresponding to a muzzle) of the controller 20. The imaging section captures (receives) light incident from the direction in which the front end of the controller 20 faces to acquire image information. A processing section that is provided inside the main body 21 analyzes the image information acquired by the imaging section, calculates light-receiving position information about infrared light (reflected light) from the reflectors 12 and 14 that has been received by the imaging section, and calculates information about the indication position of the controller 20 on the display section 10 (game screen) from the calculated light-receiving position information and reference position information that is set in advance. The indication position information calculated by the indication position detection section is output to the processing section provided inside the housing 2 through the communication cable 40. The processing section provided inside the housing 2 determines whether or not the indication position of the controller 20 when the trigger 23 has been pulled coincides with the position of the enemy character displayed on the display section 10, and performs a game process such as a game image display control process and a score calculation process. Note that a plurality of light-emitting sections may be provided over the display section 10 instead of providing a plurality of reflectors over the display section 10, and the light-emitting section provided to the controller 20 may be omitted.

The first input section 32 (hereinafter may be referred to as "left pedal") and the second input section 34 (hereinafter may be referred to as "right pedal") are foot pedal-type input sections that can be operated by a foot, and include a detection section that detects that the foot pedal has been operated (pressed). A signal (detection signal) detected by the detection section included in the first input section 32 and a signal (detection signal) detected by the detection section included in the second input section 34 are output to the processing section provided inside the housing 2.

2. Functional Blocks

Figure 2:
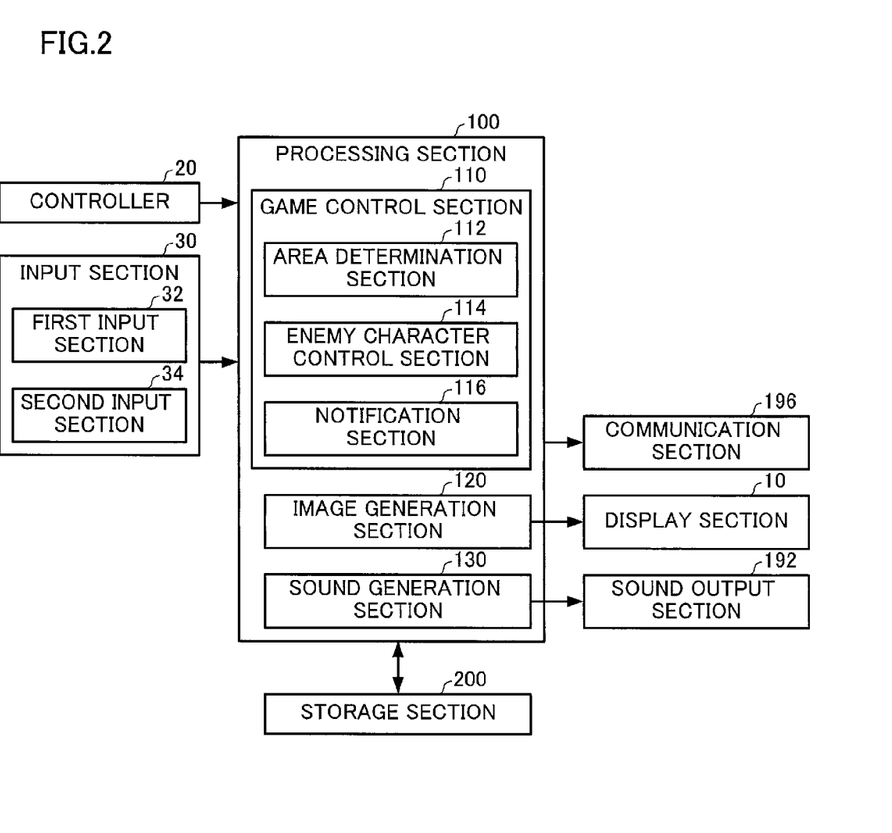
FIG. 2 is an example of a functional block diagram of a game device according to one embodiment of the invention.

FIG. 2 illustrates an example of a functional block diagram of the game device 1 according to one embodiment of the invention. Note that the game device 1 according to one embodiment of the invention may have a configuration in which some of the elements (sections) illustrated in FIG. 2 are omitted.

The controller 20 detects that the trigger 23 has been pulled, and outputs a detection signal to a processing section 100. The controller 20 detects the indication position of the controller 20 on the game screen, and outputs information about the detected indication position to the processing section 100. Note that the processing section 100 may calculate the indication position of the controller 20.

An input section 30 includes the first input section 32 and the second input section 34. Each of the first input section 32 and the second input section 34 includes the detection section that detects that the foot pedal has been pressed (operated). The function of the detection section may be implemented by a switch or the like that switches between a conduction state and a non-conduction state.

A storage section 200 stores a program that causes a computer to function as each section of the processing section 100, and various types of data, and serves as a work area for the processing section 100. The function of the storage section 200 may be implemented by a hard disk, a RAM, or the like.

The processing section 100 (processor) includes a game control section 110, an image generation section 120, and a sound generation section 130, and performs various processes such as the game process and an image generation process based on a signal output from the controller 20, a signal output from the input section 30, a program, and the like. The function of the processing section 100 may be implemented by hardware such as a processor (CPU, DSP, etc.) or an ASIC (gate array, etc.), or a program (game program).

The game control section 110 performs a process that disposes various objects (e.g., enemy character, bullet, player character, and map) in the game space (object space), a process that causes various objects to move or make a motion, a process that controls a virtual camera, and the like. The game control section 110 includes an area determination section 112 and an enemy character control section 114.

The area determination section 112 determines an area among a plurality of areas in which a player character or a virtual camera is located in a game space, the area in which the player character or the virtual camera is located being changed in accordance with an input performed using the first input section 32 or the second input section 34. A first area and a second area (i.e., a plurality of areas) respectively correspond to the first input section 32 and the second input section 34.

The enemy character control section 114 controls the motion of one or more enemy characters in the game space.

The game control section 110 sets an input section among the plurality of input sections (first input section 32 and second input section 34) to be an input section that allows the player to perform an area change input for changing the area in which the player character or the virtual camera is located, based on the determination result of the area determination section 112, changes the area in which the player character or the virtual camera is located when the input section among the plurality of input sections that allows the player to perform the area change input has been operated, and enables the attack input for attacking the one or more enemy characters in the area in which the player character or the virtual camera is located when an input section among the plurality of input sections other than the input section that allows the player to perform the area change input has been operated.

For example, the game control section 110 sets the second input section 34 to be the input section that allows the player to perform the area change input when the player character or the virtual camera is located in the first area. When the second input section 34 has been operated, the game control section 110 changes the area in which the player character or the virtual camera is located from the first area to the second area. When the first input section 32 has been operated, the game control section 110 enables the attack input (i.e., operation of the trigger 23) for attacking (shooting) the enemy character in the first area. The game control section 110 sets the first input section 32 to be the input section that allows the player to perform the area change input when the player character or the virtual camera is located in the second area. When the first input section 32 has been operated, the game control section 110 changes the area in which the player character or the virtual camera is located from the second area to the first area. When the second input section 34 has been operated, the game control section 110 enables the attack input for attacking the enemy character in the second area.

The game control section 110 performs a game process for attacking (shooting) the enemy character in the game space based on the detection signal output from the controller 20 and the information about the indication position when the attack input has been enabled (i.e., when the area in which the player character or the virtual camera is located has been set to the attack state). Specifically, the game control section 110 determines whether or not the indication position detected when the trigger 23 has been pulled coincides with (hits) the display position of the enemy character. When the game control section 110 has determined that the indication position coincides with the display position of the enemy character, the game control section 110 performs a process for displaying an effect image that shows that a bullet has hit the enemy character, a process for calculating the score, and the like.

The enemy character control section 114 controls the one or more enemy characters based on the determination result of the area determination section 112. For example, the enemy character control section 114 may set the state of at least some of the enemy characters to a defense state when a predetermined time has elapsed after the input section other than the input section that allows the player to perform the area change input has been operated (after the attack input has been enabled, or after the area in which the player character or the virtual camera is located has been set to the attack state). The enemy character control section 114 may change the predetermined time in accordance with the difficulty level of the game or the level of the player.

The enemy character control section 114 may set the state of the enemy character to a state in which the enemy character cannot make an attack in the area in which the player character or the virtual camera is located until a predetermined time elapses after the area in which the player character or the virtual camera is located has been changed, and set the state of the enemy character to a state in which the enemy character can make an attack in the area in which the player character or the virtual camera is located when the predetermined time has elapsed.

The game control section 110 may further include a notification section 116. The notification section 116 may present a notification that instructs the player to operate the input section that allows the player to perform the area change input when a time in which the plurality of input sections are not operated has reached a predetermined time. The notification section 116 may present the notification by displaying characters or an image that represents the notification in the game image, or outputting a sound that represents the notification. The notification section 116 may present the notification that instructs the player to operate the input section that allows the player to perform the area change input when a number of times in which the input section other than the input section that allows the player to perform the area change input has been consecutively operated, has reached a predetermined number.

The game control section 110 may disable an operation performed on the input section that allows the player to perform the area change input when the state of the enemy character is set to a state in which the enemy character can make an attack in the area in which the player character or the virtual camera is located when the area in which the player character or the virtual camera is located is changed.

The image generation section 120 performs a drawing process based on the results of various processes performed by the processing section 100 to generate a game image, and outputs the generated game image to the display section 10. The image generation section 120 may generate a two-dimensional image as the game image, or may generate an image (three-dimensional image) viewed from the virtual camera (given viewpoint) within the object space (game space) as the game image.

The sound generation section 130 performs a sound generation process based on the results of various processes performed by the processing section 100 to generate game sound such as background music (BGM), effect sound, or voice, and outputs the generated game sound to a sound output section 192.

The display section 10 outputs the image generated by the image generation section 120. The function of the display section 10 may be implemented by an LCD, a CRT, or the like.

The sound output section 192 outputs the sound generated by the processing section 100. The function of the sound output section 192 may be implemented by a speaker, a headphone, or the like.

A communication section 196 performs various control processes for communicating with another game device or a server. The function of the communication section 196 may be implemented by hardware such as a processor or a communication ASIC, a program, or the like.

Note that the game device may receive a program and data for causing a computer to function as each section of the processing section 100 from a storage section included in a server through a network, and store the received program and data in the storage section 200. A case where the game device operates based on a program and data received from the server is intended to be included within the scope of the invention.

3. Method

A method according to one embodiment of the invention is described below with reference to the drawings.

The game device according to one embodiment of the invention is configured to realize a first-person shooting game (FPS) in which the player character attacks an enemy character in the game space based on an attack input (i.e., operation of the trigger 23) performed on the controller 20. The player can change the position of the virtual camera (hereinafter may be referred to as "viewpoint") in the game space, and switch the state of each area between the attack state and the defense state by operating the first input section 32 and the second input section 34.

Figure 3A:
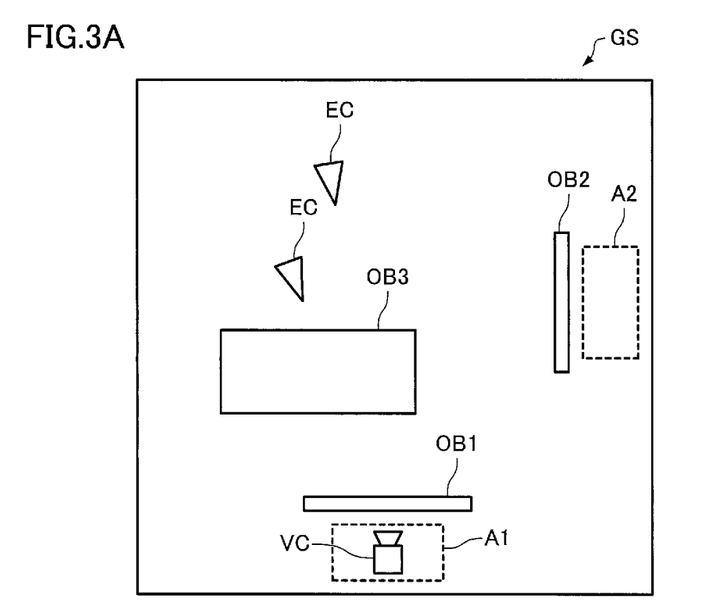
FIGS. 3A and 3B illustrate an example of a game space and a game image.

As illustrated in FIG. 3A, a plurality of enemy characters EC are placed in a game space GS. The enemy characters EC make an attack motion, a defense motion, and the like based on a given algorithm. In FIG. 3A, each enemy character EC is indicated by a triangle, and faces in the direction indicated by the smallest apex angle of the triangle.

A first area A1 (hereinafter may be referred to as "left area") and a second area A2 (hereinafter may be referred to as "right area") are set within the game space GS as a plurality of areas. The virtual camera VC is located in the first area A1 or the second area A2. In the example illustrated in FIG. 3A, a plurality of obstacles OB1 to OB3 (covers) are placed in the game space GS. Note that the player character is not placed in the game space GS because the game according to this embodiment is the game is a first-person game. When realizing a third-person game (e.g., TPS), the player character is placed in the first area A1 or the second area A2, and the virtual camera is located behind the player character so as to follow the player character.

Figure 3B:
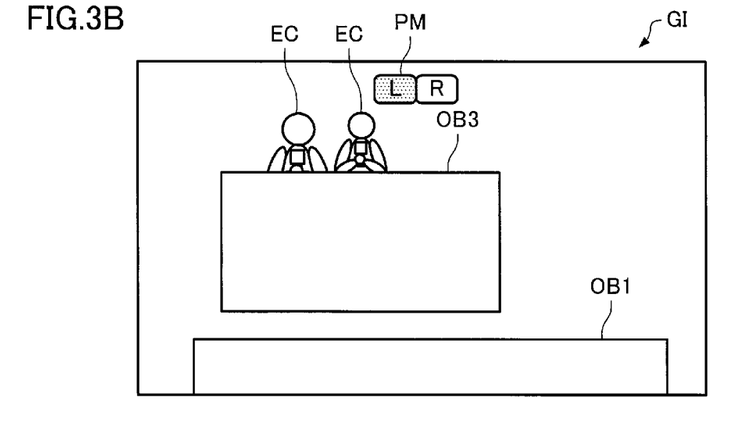

In the example illustrated in FIG. 3A, the virtual camera VC is located in the first area A1. FIG. 3B illustrates a game image GI (i.e., the game screen displayed on the display section 10) that is generated in such a state. The game image GI illustrated in FIG. 3B shows a state in which two enemy characters EC that are located behind the obstacles OB1 and OB3 make an attack toward the first area A1 (viewpoint). The game image GI illustrated in FIG. 3B includes an image PM that represents that the viewpoint is currently located in the first area A1 (left area).

Figure 4A:
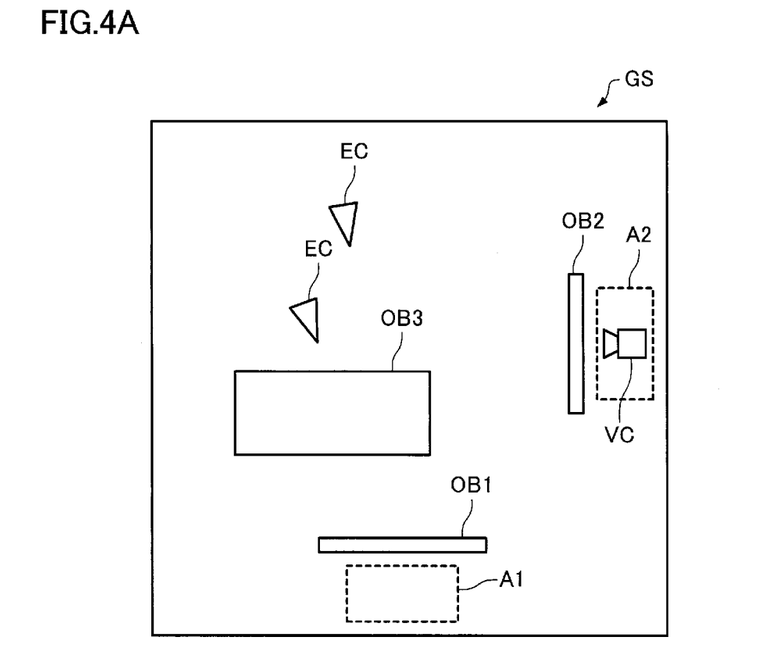
FIGS. 4A and 4B illustrate an example of a game space and a game image.
Figure 4B:
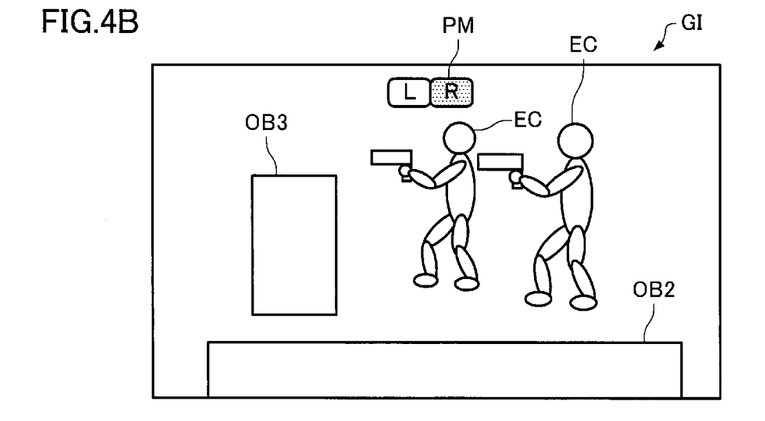

In the example illustrated in FIG. 4A, the virtual camera VC is located in the second area A2. FIG. 4B illustrates the game image GI that is generated in such a state. The game image GI illustrated in FIG. 4B shows a state in which two enemy characters EC that are located on the right side of the obstacle OB3 make an attack toward the first area A1 (left side). The game image GI illustrated in FIG. 4B includes the image PM that represents that the viewpoint is currently located in the second area A2 (right area).

The player can change the position of the virtual camera VC from the first area A1 to the second area A2, or from the second area A2 to the first area A1, by operating the first input section 32 and the second input section 34.

More specifically, the first input section 32 corresponds to the first area A1, and the second input section 34 corresponds to the second area A2. When the input section that corresponds to the first area A1 or the second area A2 in which the virtual camera VC is not located has been operated (i.e., the foot pedal has been pressed by the foot), the area in which the virtual camera VC is located is changed to the area corresponding to the input section that has been operated.

Specifically, when the second input section 34 has been operated in a state in which the virtual camera VC is located in the first area A1 (see FIG. 3A), the position of the virtual camera VC is changed to the second area A2. When the first input section 32 has been operated in a state in which the virtual camera VC is located in the second area A2 (see FIG. 4A), the position of the virtual camera VC is changed to the first area A1. Note that the game image may be displayed to continuously change from the game image GI illustrated in FIG. 3B to the game image GI illustrated in FIG. 4B by moving the virtual camera VC from the first area A1 to the second area A2 when changing the position of the virtual camera VC from the first area A1 to the second area A2, for example.

The player can switch the state of the area in which the virtual camera VC is situated between the attack state in which the player character can attack the enemy character EC (i.e., the attack input is enabled), and the defense state in which the player character is not attacked by the enemy character EC, by operating the first input section 32 and the second input section 34.

More specifically, when the input section that corresponds to the area in which the virtual camera VC is located has been operated, the state of the area in which the virtual camera VC is located is set to the attack state, and the player character can attack the enemy character EC.

Specifically, when the first input section 32 has been operated in a state in which the virtual camera VC is located in the first area A1 (see FIG. 3A), the first area A1 is set to the attack state, and the player character can attack the enemy character EC. When the second input section 34 has been operated in a state in which the virtual camera VC is located in the second area A2 (see FIG. 4A), the second area A2 is set to the attack state, and the player character can attack the enemy character EC. FIG. 3B illustrates the game image GI that is generated when the first area A1 is set to the attack state, and FIG. 4B illustrates the game image GI that is generated when the second area A2 is set to the attack state. The player character can attack (shoot) the enemy character EC in the attack state when the player operates the trigger 23 (performing the attack input) while aiming the controller 20 at the enemy character EC displayed in the game image GI.

The state of the area in which the virtual camera VC is located is set to the defense state when the first input section 32 and the second input section 34 are not operated. Specifically, when the first input section 32 and the second input section 34 are not operated in a state in which the virtual camera VC is located in the first area A1, the first area A1 is set to the defense state. When the first input section 32 and the second input section 34 are not operated in a state in which the virtual camera VC is located in the second area A2, the second area A2 is set to the defense state.

Figure 5A:
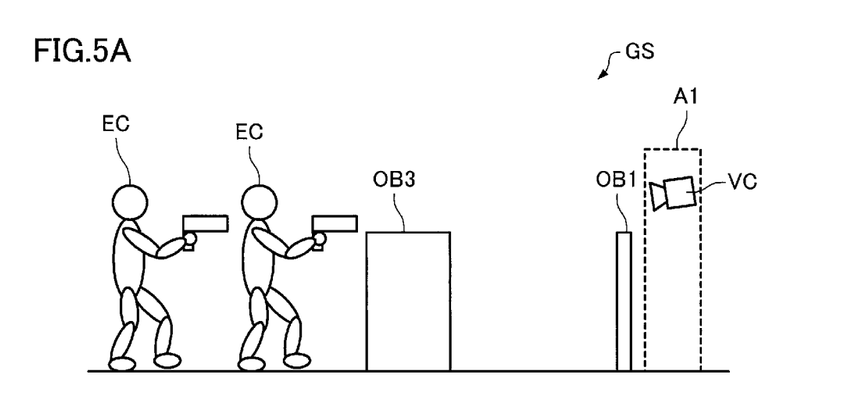
FIGS. 5A to 5C illustrate an example of a game space and a game image.
Figure 5B:
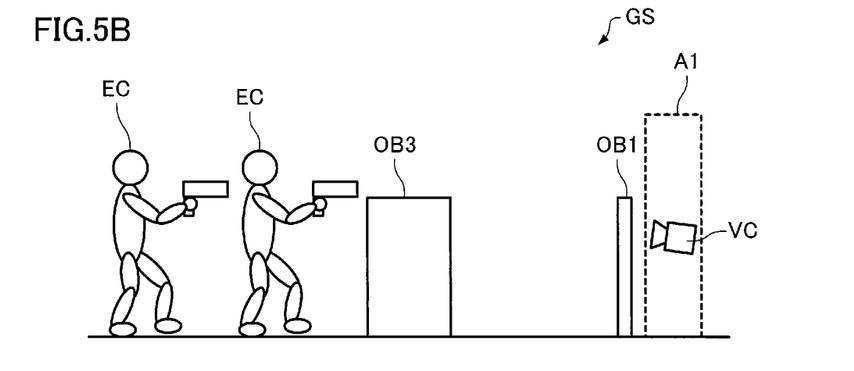
Figure 5C:
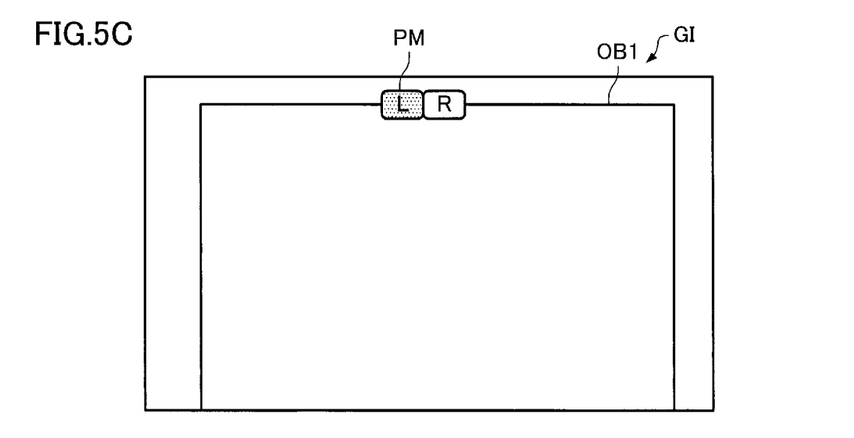

For example, when the virtual camera VC is located in the first area A1, and the first area A1 is set to the attack state, the virtual camera VC is located at a position above the upper end of the obstacle OB1 (see FIG. 5A). When the first area A1 has been set to the defense state, the virtual camera VC is located at a position below the upper end of the obstacle OB1 (i.e., the viewpoint is hidden behind the obstacle OB1 when viewed from the enemy character EC) (see FIG. 5B). This also applies to the case where the virtual camera VC is located in the second area A2. FIG. 5C illustrates the game image GI that is generated when the first area A1 is set to the defense state. In the game image GI illustrated in FIG. 5C, only the obstacle OB1 is displayed, and the enemy character EC is not displayed. The player character is not attacked by the enemy character EC in the defense state, but cannot attack the enemy character EC (i.e., the attack input is disabled). Note that the weapon of the player character is reloaded each time the state of the area in which the virtual camera VC is located has been set to the defense state.

Figure 6:
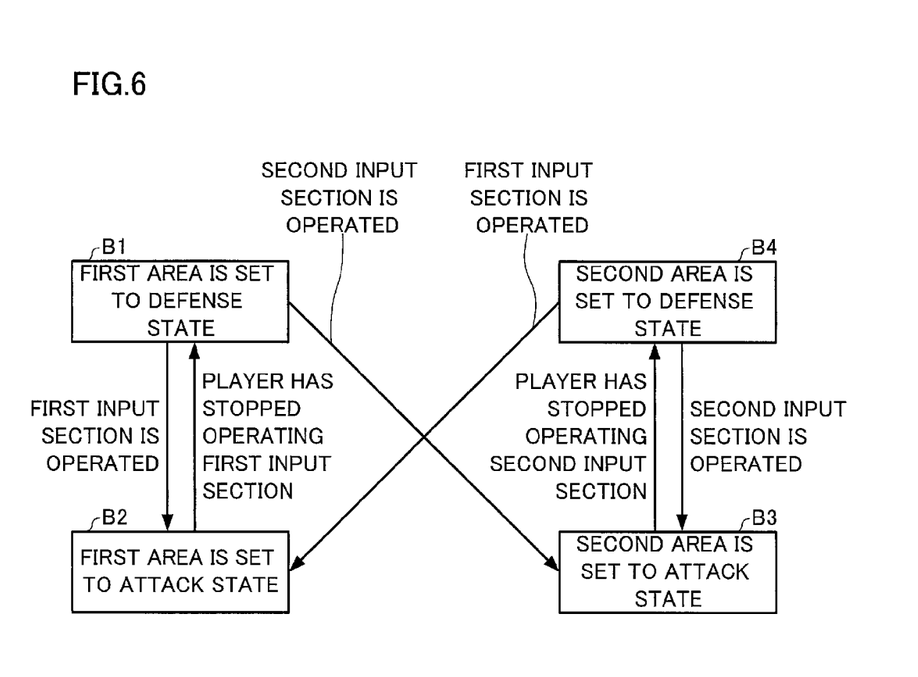
FIG. 6 is a diagram illustrating a transition between each state in a game.

FIG. 6 is a diagram illustrating a transition between each state (i.e., an area in which the virtual camera VC is located, the attack state, and the defense state) in the game according to one embodiment of the invention.

When the game has started, and the input section 30 is not operated (initial state), the virtual camera VC is located in the first area A1, and the first area A1 is set to the defense state (B1). When the player has operated the first input section 32 (has pressed the left pedal) in a state in which the first area A1 is set to the defense state (B1), the first area A1 is set to the attack state (B2). When the player has stopped operating the first input section 32 (has removed the foot from the left pedal) in a state in which the first area A1 is set to the attack state (B2), the first area A1 is set to is set to the defense state (B1).

When the player has operated the second input section 34 (has pressed the right pedal) in a state in which the first area A1 is set to the defense state (B1), the position of the virtual camera VC is changed to the second area A2, and the second area A2 is set to the attack state (B3) since the second input section 34 is being operated. When the player has stopped operating the second input section 34 (has removed the foot from the right pedal) in a state in which the second area A2 is set to the attack state (B3), the second area A2 is set to is set to the defense state (B4). When the player has operated the second input section 34 in a state in which the second area A2 is set to is set to the defense state (B4), the second area A2 is set to the attack state (B3).

When the player has operated the first input section 32 in a state in which the second area A2 is set to the defense state (B4), the position of the virtual camera VC is changed to the first area A1, and the first area A1 is set to the attack state (B2) since the first input section 32 is being operated.

As described above, the player can set the state of the area in which the virtual camera VC is located to the defense state by not operating the first input section 32 and the second input section 34, set the area in which the virtual camera VC is located to the attack state by operating the first input section 32 or the second input section 34 that corresponds to the area in which the virtual camera VC is located. The player can change the position of the virtual camera VC to the area in which the virtual camera VC is not located, and set the area in which the virtual camera VC is located to the attack state by operating the first input section 32 or the second input section 34 that corresponds to the area in which the virtual camera VC is not situated.

The transition illustrated in FIG. 6 is on the assumption that the player operates the first input section 32 and the second input section 34 by one foot, and a case where the player operates the first input section 32 and the second input section 34 at the same time is excluded. Note that the input section 30 may be configured so that the player can operate the first input section 32 and the second input section 34 at the same time. For example, when the player has operated the second input section 34 while operating the first input section 32 in a state in which the virtual camera VC is located in the first area A1, a transition from the state B2 (in which the first area A1 is set to the attack state) to the state B3 (in which the second area A2 is set to the attack state) may occur. When the player has operated the first input section 32 while operating the second input section 34 in a state in which the virtual camera VC is located in the second area A2, a transition from the state B3 (in which the second area A2 is set to the attack state) to the state B2 (in which the first area A1 is set to the attack state) may occur.

Since the game device according to one embodiment of the invention allows the player to change the position of the viewpoint (virtual camera VC), and switch the state of the area in which the viewpoint (virtual camera VC) is located between the attack state and the defense state, by performing a simple operation that presses or releases the left pedal or the right pedal (i.e., a plurality of input sections), it is possible to realize an interesting game. For example, when the enemy character EC is present behind the obstacle OB3, and it is difficult to attack the enemy character EC in the first area A1 (left area) (see FIG. 3B), the player can change the position of the viewpoint to the second area A2 (right area) by operating the second input section 34 (right pedal), and attack the enemy character EC on the flank (see FIG. 4B). It is possible to realize such game play using a simple operation.

The game device according to one embodiment of the invention may be configured so that the state of at least some of the enemy characters EC may be set to the defense state when a predetermined time (e.g., 5 seconds) has elapsed after a transition to the attack state (B2 or B3) has occurred. For example, the enemy character EC may hide behind the obstacle OB3 when the predetermined time has elapsed after the first area A1 has been set to the attack state (see FIG. 3B) so that the player character cannot attack the enemy character EC in the first area A1. According to this configuration, since the player needs to change the viewpoint when the predetermined time has elapsed after the first area A1 or the second area A2 has been set to the attack state, it is possible to motivate the player to perform an operation that changes the viewpoint (i.e., an operation that presses the right pedal when the viewpoint is located in the left area, and an operation that presses the left pedal when the viewpoint is located in the right area). This makes it possible to realize a more interesting game.

Note that the predetermined time may be changed in accordance with the difficulty level of the game that is set when starting the game, or the level of the player that is updated during the game. For example, the predetermined time may be shortened as the difficulty level of the game increases, or the level of the player increases. This makes it possible to provide enjoyment in accordance with the difficulty level of the game or the level of the player.

Figure 7A:
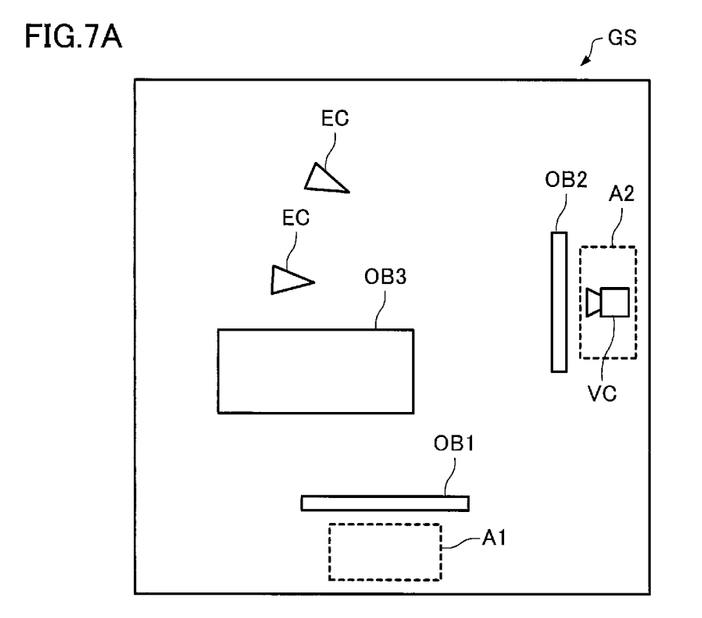
FIGS. 7A and 7B illustrate an example of a game space and a game image.
Figure 7B:
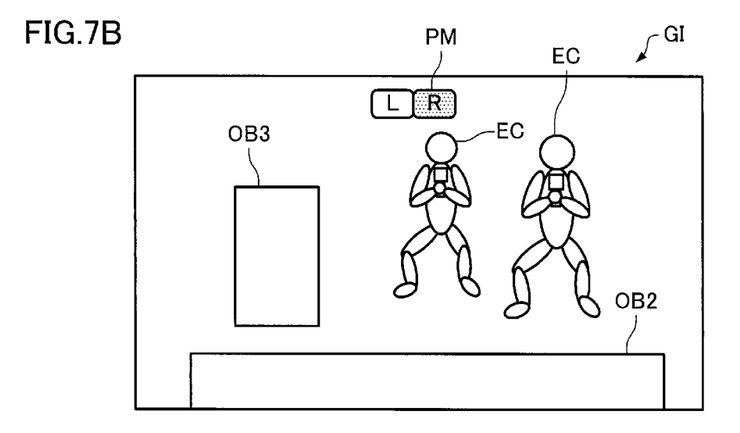

The game device according to one embodiment of the invention may be configured so that the state of the enemy character EC is set to a state in which the enemy character EC cannot make an attack in the area in which the virtual camera VC is located until a predetermined time elapses after the area in which the virtual camera VC is located has been changed, and set to a state in which the enemy character EC can make an attack in the area in which the virtual camera VC is located when the predetermined time has elapsed. For example, the enemy character EC is controlled to continue to make an attack in the first area A1 (see FIGS. 4A and 4B) until the predetermined time elapses after the position of the viewpoint has been changed from the first area A1 to the second area A2, and starts to make an attack in the second area A2 (face the viewpoint) (see FIGS. 7A and 7B) when the predetermined time has elapsed. According to this configuration, since the player character is not attacked by the enemy character EC until the predetermined time elapses after the position of the viewpoint has been changed, the player can enjoy game play for attacking the enemy character EC within the predetermined time after changing the position of the viewpoint, and for changing the position of the viewpoint again, or setting the state of the area in which the viewpoint is located to the defense state. This makes it possible to realize a more interesting game. Note that the predetermined time may be changed in accordance with the difficulty level of the game or the level of the player. For example, the predetermined time may be shortened as the difficulty level of the game increases, or the level of the player increases.

Figure 8:
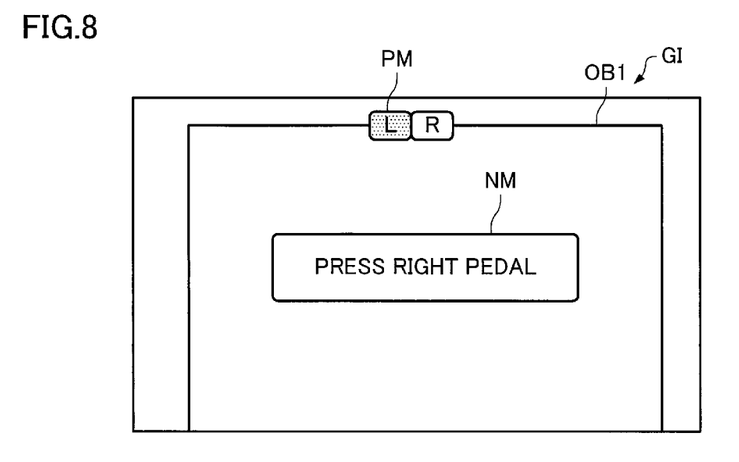
FIG. 8 illustrates an example of a game image.

The game device according to one embodiment of the invention may be configured to present a notification that instructs the player to perform an operation for changing the position of the viewpoint when a time in which the first input section 32 and the second input section 34 are not operated has reached a predetermined time. For example, when the predetermined time has elapsed after the left area has been set to the defense state (see FIG. 5C), a notification image NM that instructs the player to perform an operation for pressing the right pedal (see FIG. 8) is displayed in the game image GI. This makes it possible to prompt the player to perform an operation for changing the position of the viewpoint when the first input section 32 and the second input section 34 are not operated.

The game device according to one embodiment of the invention may be configured to present a notification that instructs the player to perform an operation for changing the position of the viewpoint when the number of times in which an operation for switching the state of the area in which the viewpoint is located between the attack state and the defense state (i.e., an operation performed on the input section that is not used to change the area) has been consecutively performed, has reached a predetermined number. For example, when an operation for pressing the left pedal in a state in which the viewpoint is located in the left area has been consecutively performed for the predetermined number of times, the notification image NM that instructs the player to perform an operation for pressing the right pedal (see FIG. 8) is displayed in the game image GI. This makes it possible to prompt the player to perform an operation for changing the position of the viewpoint when only an operation for switching the state of the area in which the viewpoint is located between the attack state and the defense state is performed. For example, it is possible to prompt the player to change the position of the viewpoint when it is impossible to effectively attack the enemy character EC unless the position of the viewpoint is changed.

The game device according to one embodiment of the invention may be configured so that an operation for changing the position of the viewpoint is not accepted (disabled) when the player character is attacked by the enemy character EC (i.e., when the enemy character EC faces the area to which the position of the viewpoint is to be changed) if the position of the viewpoint is changed. For example, when an operation for changing the position of the viewpoint to the first area A1 (i.e., an operation for pressing the left pedal) has been performed in a state in which the viewpoint is located in the second area A2, and the enemy character EC makes an attack in the first area A1 (faces the first area A1) (see FIGS. 4A and 4B), the operation is disabled, and the position of the viewpoint is not changed. This makes it possible to prevent occurrence of a situation that is disadvantageous for the player in which the player character is attacked by the enemy character EC immediately after changing the position of the viewpoint, for example. Note that an image that warns the player that the player character will be attacked by the enemy character EC if the position of the viewpoint is changed may be displayed in the game image GI instead of disabling an operation for changing the position of the viewpoint, or the motion speed of the enemy character EC may be reduced when an operation for changing the position of the viewpoint has been performed, or an attack made by the enemy character EC may be disabled (i.e., the player character may not be damaged by an attack made by the enemy character EC). According to the game device according to one embodiment of the invention, when the player has changed the position of the viewpoint from the second area A2 to the first area A1 by performing an operation for pressing the left pedal, for example, the left pedal then functions as a pedal for setting the area in which the viewpoint is located to the attack state. Therefore, the area in which the viewpoint is located is normally set to the attack state after the position of the viewpoint has been changed, and the player character is attacked by the enemy character EC when the enemy character EC faces the area in which the viewpoint is located. Since such a situation is disadvantageous for the player, the area in which the viewpoint is located may be set to the defense state instead of the attack state even when the pedal is continuously pressed after the position of the viewpoint has been changed.

4. Process

Figure 9:
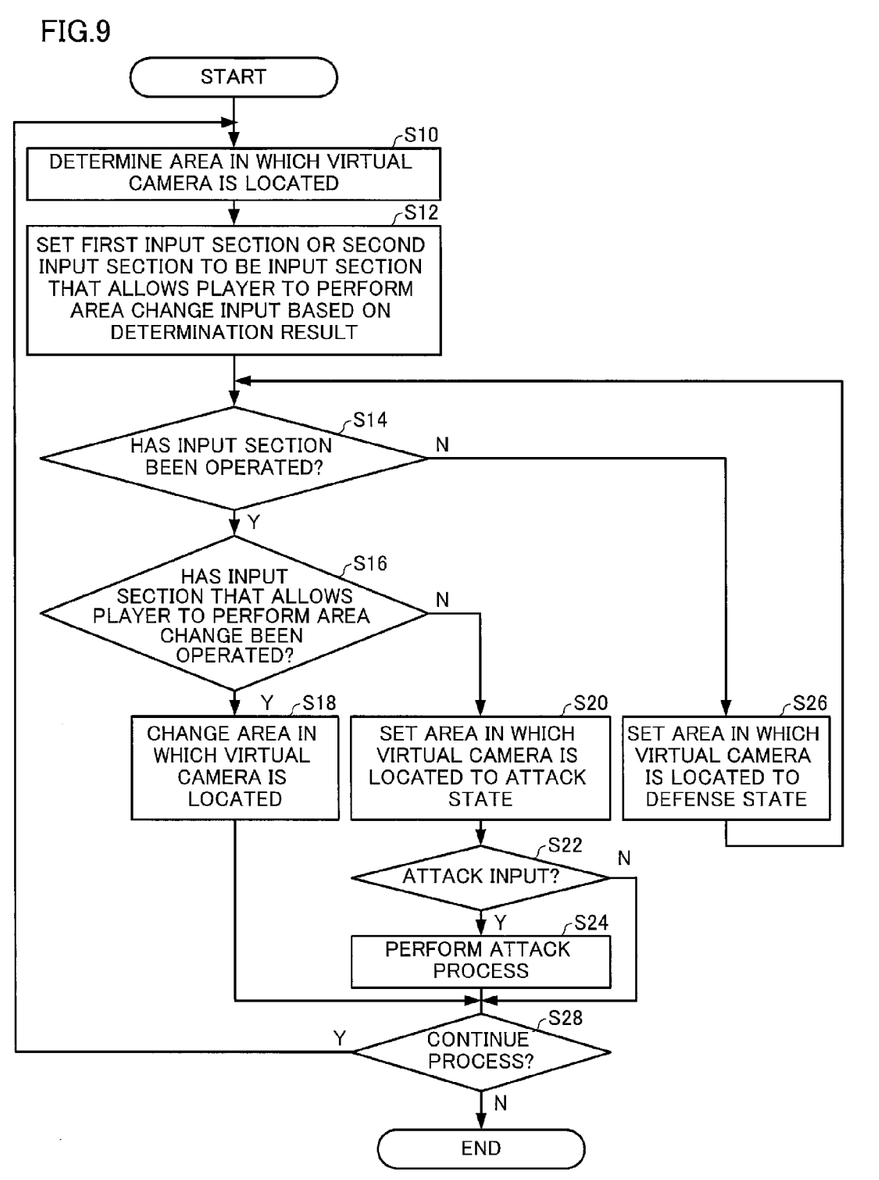
FIG. 9 is a flowchart illustrating the flow of a process according to one embodiment of the invention.

An example of the process performed by the game device according to one embodiment of the invention is described below with reference to FIG. 9 (flowchart).

The area determination section 112 determines whether the virtual camera VC is located in the first area A1 or the second area A2 (step S10). The game control section 110 sets the first input section 32 or the second input section 34 to be the input section that allows the player to perform the area change input (i.e., an area change input by which the area where the virtual camera VC is located is changed) based on the determination result (step S12). Specifically, when the virtual camera VC is located in the first area A1, the game control section 110 sets the second input section 34 to be the input section that allows the player to perform the area change input. When the virtual camera VC is situated in the second area A2, the game control section 110 sets the first input section 32 to be the input section that allows the player to perform the area change input.

The game control section 110 determines whether or not the first input section 32 or the second input section 34 has been operated (step S14). When the first input section 32 or the second input section 34 has been operated (Y in step S14), the game control section 110 determines whether or not the first input section 32 or the second input section 34 that has been operated is the input section that allows the player to perform the area change input (step S16).

When the first input section 32 or the second input section 34 that has been operated is the input section that allows the player to perform the area change input (Y in step S16), the game control section 110 changes the area in which the virtual camera VC is located (step S18), and performs a step S28. Specifically, when the first input section 32 is set to be the input section that allows the player to perform the area change input, and has been operated, the game control section 110 changes the position of the virtual camera VC to the first area A1. When the second input section 34 is set to be the input section that allows the player to perform the area change input, and has been operated, the game control section 110 changes the position of the virtual camera VC to the second area A2.

When the first input section 32 or the second input section 34 that has been operated is not the input section that allows the player to perform the area change input (N in step S16), the game control section 110 sets the area in which the virtual camera VC is located to the attack state (step S20). The game control section 110 determines whether or not the attack input has been performed (i.e., whether or not the trigger 23 has been operated) (step S22). When the attack input has been performed (Y in step S22), the game control section 110 performs the attack process for attacking the enemy character in the area in which the virtual camera VC is located (step S24). Specifically, the game control section 110 determines whether or not the indication position detected by the controller 20 coincides with the display position of the enemy character EC. When the game control section 110 has determined that the indication position detected by the controller 20 coincides with the display position of the enemy character EC, the game control section 110 performs the process that causes a bullet to hit the enemy character EC, and calculates the damage level of the enemy character EC. When the attack input has not been performed (N in step S22), the game control section 110 performs the step S28.

When the first input section 32 and the second input section 34 have not been operated (N in step S14), the game control section 110 sets the area in which the virtual camera VC is located to the defense state (step S16), and performs the step S14. Specifically, the game control section 110 performs the process that changes the position of the virtual camera VC to a position behind the obstacle (cover) or the like when viewed from the enemy character EC, and reloads the weapon of the player character.

The game control section 110 then determines whether or not to continue the process (step S24). When the game control section 110 has determined to continue the process, the step 10 is performed again.

Note that the enemy character control section 114 controls the enemy character EC (i.e., controls the attack motion, the defense motion, and the movement of the enemy character EC) as background processing. The enemy character control section 114 may cause the enemy character EC to make an attack in the area in which the virtual camera VC is located until a predetermined time elapses after the area in which the virtual camera VC is located has been set to the attack state in the step S20, and set the enemy character EC to the defense state when the predetermined time has elapsed. The enemy character control section 114 may cause the enemy character EC to make an attack in the area in which the virtual camera VC is not located until a predetermined time elapses after the area in which the virtual camera VC is located has been changed in the step S20, and cause the enemy character EC to make an attack in the area in which the virtual camera VC is located when the predetermined time has elapsed. Note that the game control section 110 calculates the damage level of the player character due to an attack by the enemy character EC when the area in which the virtual camera VC is located is set to the attack state, and does not calculate the damage level of the player character when the area in which the virtual camera VC is located is set to the defense state.

5. Modifications

The invention is not limited to the above embodiments. Various modifications and variations may be made of the above embodiments. Any term cited with a different term having a broader meaning or the same meaning at least once in the specification and the drawings may be replaced by the different term in any place in the specification and the drawings.

Although the above embodiments have been described taking an example in which the game device includes two input sections, the game device may include N (N is an integer equal to or larger than 3) input sections, and first to Nth areas that correspond to first to Nth input sections may be set in the game space.

Although the above embodiments have been described taking an example in which a plurality of areas are set in the game space as a fixed area, a plurality of areas may be set as an area that changes in position within the game space with the passage of time (e.g., an area that moves to follow the virtual camera VC or the player character).

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. A game device that includes a plurality of inputs, and executes a game in which a player character attacks an enemy character based on an attack input performed by a player, the plurality of inputs including a first input configured to be operated by the player and a second input configured to be operated by the player, the game device comprising:

a processor and a memory, the processor is configured to execute a program stored in the memory to
  determine an area among a plurality of predetermined areas in which the player character or a virtual camera is located in a game space;
  control a motion of one or more enemy characters in the game space; and
  control an attack on the one or more enemy characters from one of the plurality of predetermined areas in which the player character or the virtual camera is located,
the processor is further configured to (i) set one of the first input and the second input among the plurality of inputs to allow the player to perform an area change input that changes the area in which the player character or the virtual camera is located, as an area-change-input, wherein the area-change-input changes between the first input and the second input based on a determination result as to which of the predetermined areas the player character or the virtual camera is located in, (ii) change the one of the plurality of predetermined areas in which the player character or the virtual camera is located to another one of the plurality of predetermined areas, responsive to operation of the one of the first input and the second input which is set as the area-change-input, and (iii) enable an attack input for attacking the one or more enemy characters in the area in which the player character or the virtual camera is located responsive to operation of the other of the first input and the second input, as an attack-input-enablement, wherein the attack-input-enablement changes between the first input and the second input based on the determination result as to which of the predetermined areas the player character or the virtual camera is located in, wherein the first input is a first pedal, and wherein the second input is a second pedal, and the processor controls the one or more enemy characters based on the determination result as to which of the predetermined areas the player character or the virtual camera is located in.

2. The game device as defined in claim 1, wherein the processor is further configured to set a state of the enemy character to a state in which the enemy character cannot make an attack in the area in which the player character or the virtual camera is located until a predetermined time elapses after the area in which the player character or the virtual camera is located has been changed, and sets the state of the enemy character to a state in which the enemy character can make an attack in the area in which the player character or the virtual camera is located responsive to the predetermined time having elapsed.

3. The game device as defined in claim 1, wherein the processor is further configured to:
present a notification that instructs the player to operate the area-change-input that allows the player to perform the area change input, responsive to a time in which the plurality of inputs are not operated having reached a predetermined time.

4. The game device as defined in claim 1, wherein the processor is further configured to:
present a notification that instructs the player to operate the area-change-input that allows the player to perform the area change input, responsive to a number of times in which the area-change-input that allows the player to perform the area change input has been consecutively operated, having reached a predetermined number.

5. The game device as defined in claim 1, wherein the processor is further configured to:
responsive to the area in which the player character or the virtual camera is located being changed and a state of the enemy character being in a state that the enemy character can make an attack in the area in which the player character or the virtual camera is located, the processor disables an operation performed on the area-change-input that allows the player to perform the area change input.

6. The game device as defined in claim 1, wherein the processor is further configured to set a state of at least some of the one or more enemy characters to a defense state responsive to a predetermined time having elapsed after the area-change-input that allows the player to perform the area change input has been operated.

7. The game device as defined in claim 1,
wherein, when the first input is the area-change-input, (i) operation of the second input enables the attack input and (ii) operation of the first input changes the location of the player character or the virtual camera among the plurality of predetermined areas, and
wherein, when the second input is the area-change-input, (i) operation of the first input enables the attack input and (ii) operation of the second input changes the location of the player character or the virtual camera among the plurality of predetermined areas.

8. A non-transitory computer-readable information storage medium storing a program that causes a computer included in a game device that includes a plurality of inputs, the plurality of inputs including a first input configured to be operated by the player and a second input configured to be operated by the player, and executes a game in which a player character attacks an enemy character based on an attack input performed by a player, the program causing the computer to:
determine an area among a plurality of predetermined areas in which the player character or a virtual camera is located in a game space;
control a motion of one or more enemy characters in the game space; and
control an attack on the one or more enemy characters from one of the plurality of predetermined areas in which the player character or the virtual camera is located,
(i) set one of the first input and the second input among the plurality of inputs to allow the player to perform an area change input that changes the area in which the player character or the virtual camera is located, as an area-change-input, wherein the area-change-input changes between the first input and the second input based on a determination result as to which of the predetermined areas the player character or the virtual camera is located in, (ii) change the one of the plurality of predetermined areas in which the player character or the virtual camera is located to another one of the plurality of predetermined areas, responsive to operation of the one of the first input and the second input which is set as the area-change-input, and (iii) enable an attack input for attacking the one or more enemy characters in the area in which the player character or the virtual camera is located responsive to operation of the other of the first input and the second input, as an attack-input-enablement, wherein the attack-input-enablement changes between the first input and the second input based on the determination result as to which of the predetermined areas the player character or the virtual camera is located in, wherein the first input is a first pedal, and wherein the second input is a second pedal, and
control the one or more enemy characters based on the determination result as to which of the predetermined areas the player character or the virtual camera is located in.

9. The non-transitory computer-readable information storage medium as defined in claim 8,
wherein, when the first input is the area-change-input, (i) operation of the second input enables the attack input and (ii) operation of the first input changes the location of the player character or the virtual camera among the plurality of predetermined areas, and
wherein, when the second input is the area-change-input, (i) operation of the first input enables the attack input and (ii) operation of the second input changes the location of the player character or the virtual camera among the plurality of predetermined areas.

* * * * *